United States Patent [19]

Starke

[11] Patent Number: 4,830,519

[45] Date of Patent: May 16, 1989

[54] ANNULAR SEAL ASSEMBLY

[75] Inventor: Roy R. Starke, Palm Beach Gardens, Fla.

[73] Assignee: United Technologies Corporation, Hartford, Conn.

[21] Appl. No.: 34,458

[22] Filed: Apr. 6, 1987

[51] Int. Cl.$^4$ .......................... F16C 33/76; F16J 15/54
[52] U.S. Cl. ...................................... 384/485; 60/226.2; 60/228; 60/230; 137/338; 137/876; 251/214; 277/12; 277/75; 277/205; 277/236; 384/486
[58] Field of Search .................. 277/12, 27, 236, 135, 277/206 R, 71, 79, 75, DIG. 1, 70, 192-195; 165/9; 415/110, 111, 112, 115, 116, 180, 170 R, 170 A, 172 R, 172 A, 175; 60/39.83, 912, 226.2, 228, 230; 384/130, 477, 479, 484–486; 137/876, 338; 251/214; 416/95, 174, 179

[56] References Cited

U.S. PATENT DOCUMENTS

| 3,028,163 | 4/1962 | Heinrich | 415/170 A |
|---|---|---|---|
| 3,234,999 | 2/1966 | Atwood | 165/9 |
| 3,893,786 | 7/1975 | Rahnke et al. | 415/116 X |
| 4,605,169 | 8/1986 | Mayers | 60/230 X |
| 4,690,329 | 9/1987 | Madden | 60/226.2 X |

FOREIGN PATENT DOCUMENTS

| 1271463 | 6/1968 | Fed. Rep. of Germany | 60/39.83 |
| 275574 | 8/1951 | U.S.S.R. | 415/180 |

Primary Examiner—Allan N. Shoap
Attorney, Agent, or Firm—Troxell K. Snyder

[57] ABSTRACT

A seal assembly (28) is provided for sealing between a static sidewall (12), a rotating first member having a flat and annular surface (22) disposed therein, and a concentric rim (34) disposed between the sidewall (12) and first member (22). The rim (34) is supportably secured to an arcuate hood (18) which extends axially from the rim (34).

5 Claims, 3 Drawing Sheets

ANNULAR SEAL ASSEMBLY

This invention was made with Government support under a contract awarded by the Department of the Air Force. The Government has certain rights in this invention.

TECHNICAL FIELD

The present invention relates to a seal for an annular gap formed between multiple rotatable members.

BACKGROUND

The use of annular seals to form a gas tight barrier between two concentric members is well known. Likewise, the use of such seals to provide a gas tight barrier about rotatable concentric members is also known. For more complex arrangements having multiple concentric rotatable members having axially extended appendages and subject to harsh local environments, certain adaptations may be required to provide an annular seal which is both effective and practicable for achieving the desired sealing effect without impeding the movement of the rotatable members.

One such application, for example, is the exhaust nozzle of a gas turbine engine having a plurality of thrust vectoring flaps and surfaces for interacting with the high temperature engine exhaust gases. One particular configuration requiring an annular seal is a two dimensional thrust vectoring nozzle having a pair of spaced apart vertical sidewalls defining the lateral boundaries of the exhaust nozzle flow path and upper and lower movable flap assemblies for defining variable upper and lower gas path boundaries whereby nozzle outlet throat area and thrust direction may be changed by manipulation of such upper and lower flap assemblies.

In particular, one 2-D nozzle arrangement includes a convergent flap extending transversely between first and second spaced apart sidewalls and secured at each span end thereof to a rotatable first member having a flat and annular surface disposed within the corresponding sidewall. This particular nozzle arrangement also includes a semi-cylindrical arc valve, rotatable about a common axis with the convergent flap and comprised of a arcuate member extending between first and second annular rims disposed concentrically about the first members.

Rotation of the arc valve at the proper time admits a flow of exhaust gas into an alternate gas exhaust flow passage for thrust reversing and/or vectoring as desired. The annular region defined by the circumference of each corresponding first member, annular rim, and surrounding sidewall must be sealed against the high temperature, elevated pressure exhaust gases flowing within the nozzle to avoid undesirable leakage of the exhaust gases into the surrounding flap structure which includes supporting bearings, linkages, and other relatively temperature sensitive structure. As exhaust gas temperatures in an afterburning mode may reach 4,000F (2,200C) or higher and have a pressure of 30-50 psig (200-350 kPa), the annular seal for this region must not only accommodate the independent movement of the convergent flap and first member and the surrounding annular rim and arc valve, but also must achieve an effective and temperature resistant gas tight seal against the high temperature, high pressure exhaust gases contained within the exhaust nozzle.

SUMMARY OF THE INVENTION

It is therefore an object of the present invention to provide a means for sealing an annular gap defined between two concentric, coaxially rotatable members and a surrounding static structure.

It is further an object of the present invention to provide a sealing means for such an annular gap wherein one of the rotatable members includes an arcuate hood or the like extending therefrom.

It is further an object of the present invention to provide a sealing means capable of sealing against a high temperature, elevated pressure environment, such as in an exhaust nozzle of a gas turbine engine.

It is still further an object of the present invention to provide a sealing means which both protects and cools an adjacent bearing structure or the like disposed between the coaxially rotatable members adjacent the annular gap.

According to the present invention, a seal assembly is provided for an annular region formed between a rotatable first member disposed in the surface plane of a surrounding static wall structure. The arrangement includes a coaxially rotatable annular rim, located between the wall and the first member, and having an arcuate hood secured thereto. The hood extends axially with respect to the axis of rotation of the rim and first member, across the nozzle gas flow path and, in the disclosed embodiment, to another corresponding rim in the opposite sidewall.

The seal assembly according to the present invention provides two cooperatively linked sealing elements, one disposed between the static structure and the rim, and the other disposed about the first member and sealingly engaged therewith. The seal assembly includes a circular web linking the two sealing elements establishing an unbroken, gas tight barrier against the undesirable leakage of exhaust gas across the surface plane of the wall structure. For that portion of the annular region coincident with the arcuate hood, the seal assembly provides an arcuate opening in the web for accepting the hood therein.

The seal assembly according to the present invention further provides protection of the individual sealing elements as well as nearby nozzle mechanical components such as bearings or the like from a high temperature environment occurring adjacent to the wall structure such as in an exhaust nozzle of a gas turbine engine. To accomplish this, the seal assembly provides one or more internal annular volumes for conducting a flow of cooling gas such as air circumferentially around the seal assembly. The air exits the seal assembly in the disclosed embodiment via controlled internal leakage paths (not shown) provided in the sealing elements and opening into the exhaust nozzle stream for enhancing the cooling of the assembly and adjacent structures.

Undesirable gas leakage is further reduced and the aforementioned cooling enhanced by supplying the annular volumes with cooling air at an elevated pressure as compared to the gas adjacent the wall. For a seal assembly according to the present invention having a radially outward opening sealing element, such elevated pressure cooling air acts to energize the outward opening sealing element into a more positive sealing contact with the surrounding sidewall. A similar positive energizing effect is achieved at the sealing element disposed about the periphery of the first member wherein the present invention provides an L-shaped seal which is urged against the first member by the high pressure cooling air admitted within the corresponding adjacent annular volume.

The seal assembly according to the present invention thus provides a gas tight seal for a mechanical arrangement of two concentric, rotating members, one of which includes an arcuate hood projecting axially therefrom and a surrounding static structure. The seal is further adapted to integrate the functions of active seal cooling and energization of the individual seal elements by means of a flow of pressurized cooling gas supplied to the seal assembly.

Both these and other objects and advantages of the seal assembly according to the present invention will be apparent to those skilled in the art upon review of the following specification and the appended claims and drawing figures.

DETAILED DESCRIPTION OF THE INVENTION

Figure 1:
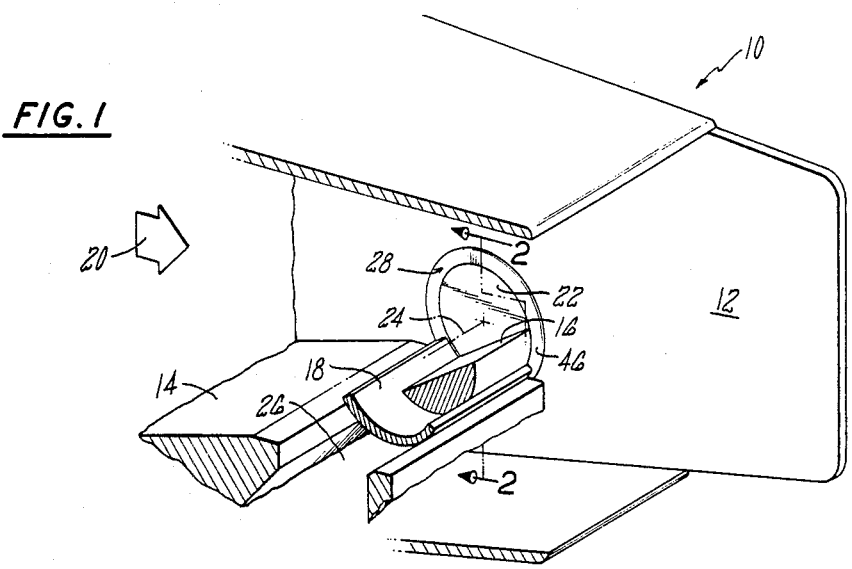
FIG. 1 shows a cut away isometric view of an exhaust nozzle having concentric, rotatable flap members disposed therein.

Referring now to the drawing Figures, and in particular to FIG. 1 thereof, the general operating environment of an exemplary embodiment of the seal assembly according to the present invention will be described. FIG. 1 shows a cut away isometric view of a portion of an exhaust nozzle 10 for a gas turbine engine. The exhaust nozzle 10 is a two dimensional nozzle, having a pair of vertical, spaced apart sidewalls, one of which 12 is shown in FIG. 1, defining the lateral nozzle gas flow boundaries. The lower gas flow boundary is defined by a generally horizontal static structure 14 and one or more movable surfaces 16, 18 for directing the flow of exhaust gas 20 as desired for thrust vectoring, reversing, etc. A similar upper gas flow boundary may be provided and is not shown in FIG. 1.

In the exhaust nozzle 10 of FIG. 1, the flow directing surfaces 16, 18 consist of a convergent flap 16 extending between a first sidewall member 22 and a second sidewall member (not shown) in the opposite sidewall (also not shown). The sidewall members 22 and hence flap 16 are rotatable about a transverse axis 24 and may be positioned as desired to divert, block, or otherwise interact with the exhaust gas 20. The second gas directing surface 18 comprises an arcuate member, termed an arc valve, or hood coaxially disposed about the first sidewall member 22 and extending axially between the first sidewall 12 and the second sidewall (not shown). The function of the arc valve 18 is to regulate the flow of exhaust gas 20 into an alternate exhaust flow passage 26 whence the flow may be directed forwardly for inducing a reversing thrust or laterally for inducing an augmented pitching moment in the nozzle and associated aircraft. The arc valve 18 and convergent flap 16 are independently positioned by a mechanical actuator system (not shown) responsive to the desired thrust and exhaust gas flow path.

The exhaust gas 20 typically passes through the nozzle 10 at a relatively elevated temperature and pressure with respect to the surrounding environment. These temperatures, up to 4,000F (2,200C) or higher, and pressures 30-50 psig (200-350 kPa), require that the annulus formed between the first member 22 and the surrounding sidewall be sealed against leakage of the exhaust gas 20 therethrough. The seal assembly 28 according to the present invention achieves a gas tight barrier in the annular region so defined and maintains said barrier as the flow directing surfaces 16, 18 rotate independently responsive to the nozzle control.

Figure 2:
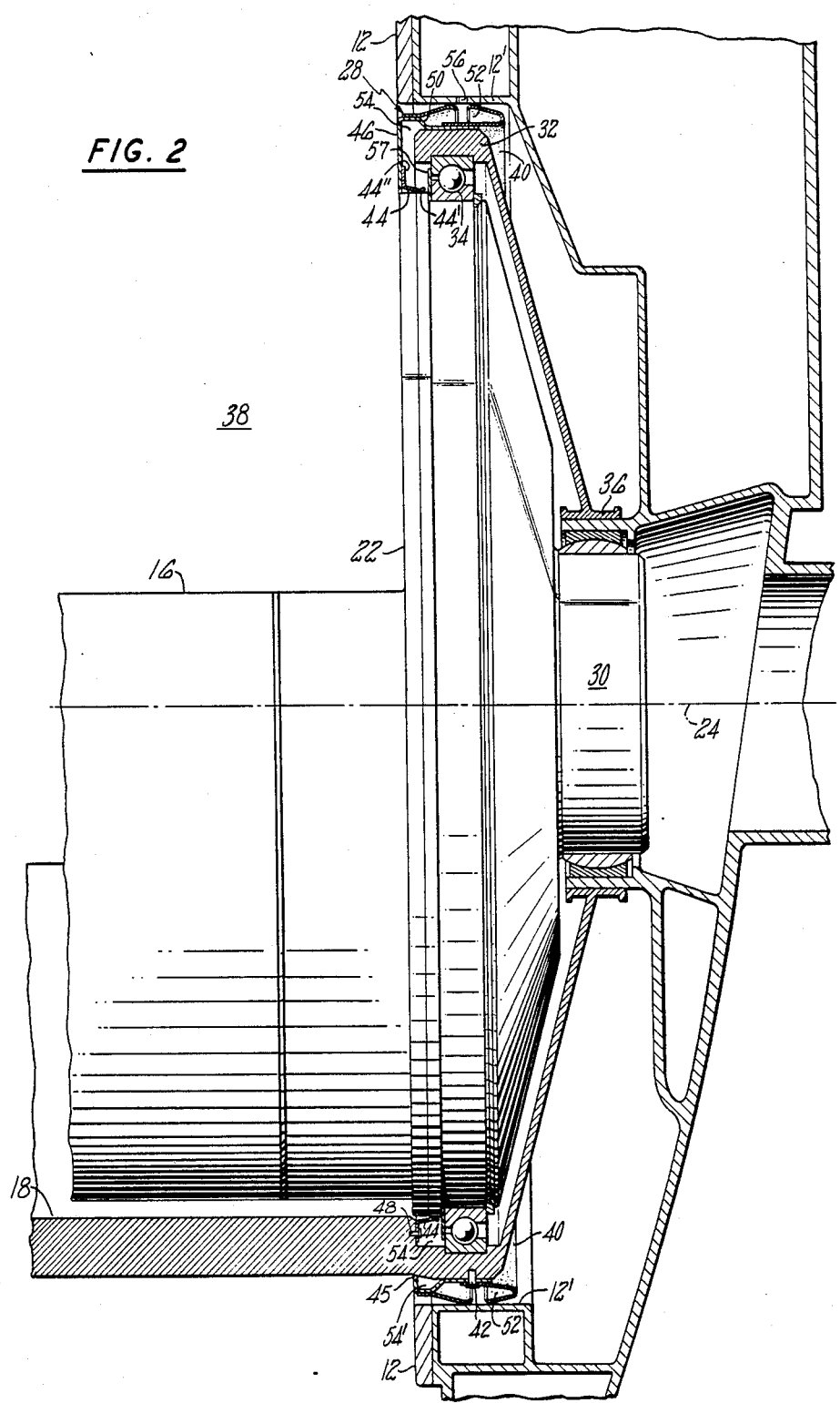
FIG. 2 shows a cross sectional view of the members and seal according to the present invention taken in the plane of the axis of rotation.
Figure 2A:
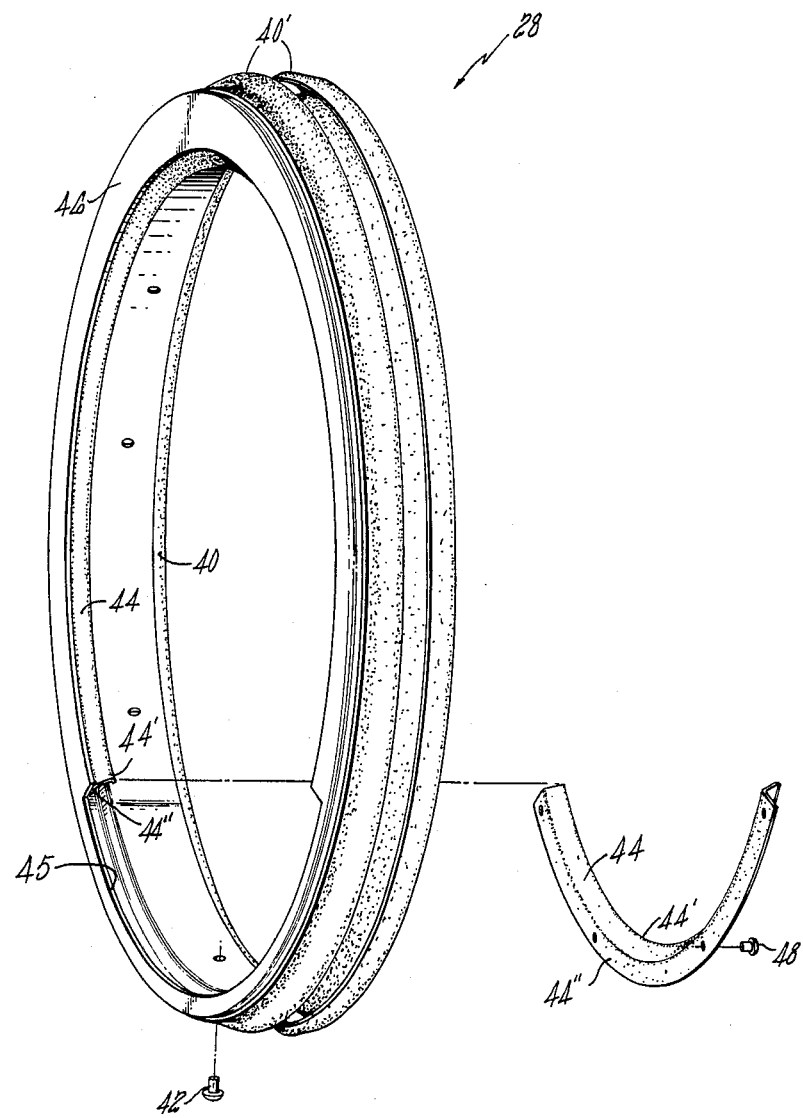
FIG. 2A shows an isometric view of the seal assembly removed from the surrounding structure of FIG. 2.

FIG. 2 is a sectional view taken through the common rotation axis 24 adjacent the sidewall 12. The first member 22 is shown disposed within the static sidewall 12 and rotatable about the common axis 24. Actuating force for rotating the first member 22 is delivered via the shaft 30 or by such other means well known in the art.

Concentrically disposed about the first member 22 is an annular rim 32 which includes the arcuate arc valve 18 secured to a sector thereof and extending axially with respect to the rotational axis 24. An annular supporting bearing 34 is disposed between an outer circumferential portion of the first member 22 and the inner radius of the rim 32. The rim 32 is likewise rotated by mechanical means operable on the rim hub 36 or the like.

As will be appreciated by those skilled in the art, the nozzle interior volume 38 through which the exhaust gas 20 passes must be separated from the bearings 34 and other nozzle structure by a gas tight barrier to prevent undesirable leakage of the hot exhaust gases into the otherwise unprotected bearings 34 and other structure. This is accomplished by the seal assembly 28 according to the present invention which includes a first sealing element 40 disposed between an axially extending annular portion 12' of the sidewall 12 and the annular rim 32.

According to the disclosed embodiment of the seal assembly 28, the first sealing element 40 comprises a seal element opening radially outward with respect to the axis 24 and being compressed between the static structure 12, 12' and the rim 32. The first element is retained against relative circumferential motion with respect to the rim 32 by a plurality of radial locating pins 42 inserted through the central portion of the element 40 and into the rim 32.

A second sealing element 44 includes an L-shaped sealing element having an annular, axially extending sealing leg 44' sealingly contacting the circumference of the first member 22, and a radially outwardly extending leg 44''. The undeflected radius of the sealing leg 44' is sized to achieve a spring bias against the outer circumference of the first member 22 when the second sealing element 44 is disposed therearound.

The seal assembly 28 according to the present invention is completed by a substantially circular, arcuate web member 46 secured between the first sealing element 40 and the second L-shaped sealing element 44 over that portion of the rim circumference which is not secured to the arc valve 18. The first and second sealing elements 40, 44 secured respectively to an axially extending circumferential portion and an impermeable radial portion of the web element 46 establish an unbroken, gas tight barrier between the static sidewall 12, 12' and the first member 22. The assembly 28 bridges over the rotatable rim 32 which, over this particular portion of its circumference, does not form a part of the gas tight barrier adjacent the nozzle interior 38.

For that portion of the seal assembly 28 which is coincident with the sector of the rim 32 secured to the arc valve 18, the gas tight barrier is achieved by sealing between the rim 32 and static sidewall 12' with the first seal 40, and between the arc valve 18 and the first member 22 with the L-shaped seal 44. In this portion of the seal assembly 28, the axially extending arc valve 18 forms the gas tight bridge between the first sealing element 40 and the second sealing element 44. A seperated portion of the L-shaped seal over the arc valve sector is secured to a radially extending axial end portion of the arc valve by axially extending pins 48 passing through the radially extending second leg 44" into the arc valve 18. The arc valve 18 is received within a corresponding arcuate opening 45 in the web 46 as its extends into the nozzle interior 38.

Figure 3:
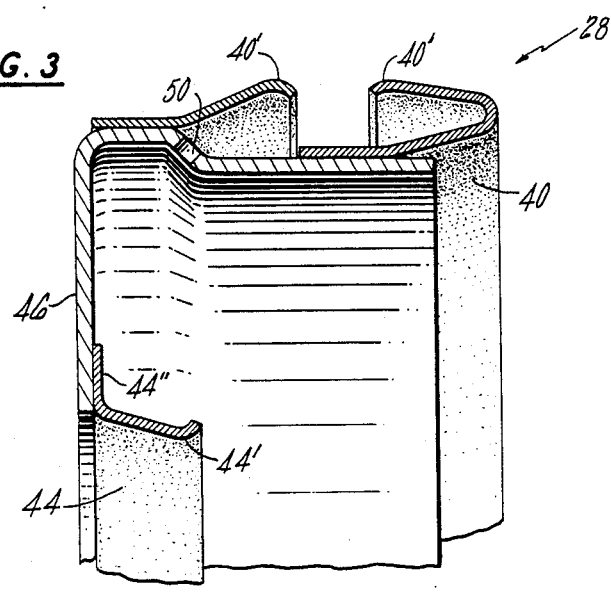
FIG. 3 shows a detailed cross sectional view of the seal according to the present invention.

FIG. 3 is a detailed cross section of the seal assembly 28 according to the present invention which more clearly shows an internal flow passage 50 providing fluid communication between the annular volume formed by the first sealing element 40 and the static structure 12' and a second annular volume 54 defined by the web 46, second L-shaped sealing element 44, the annular rim 32 and the bearing 34. During operation of the seal assembly 28 adjacent a high temperature environment such as a gas turbine engine exhaust stream, cooling air is admitted into the first annular volume 52 via one or more cooling flow passages 56 disposed in the static sidewall structure 12'. Cooling air flows into the first annular volume 52 moving circumferentially about the seal assembly 28 and entering the internal flow openings 50 which conduct the cooling air into the second annular volume 54 for cooling the web 46 and adjacent bearings 34. The cooling air may exit the second annular volume 54 by flow openings placed in the L-shaped sealing element leg 44', by leakage across the bearings 34, or by other means, such as transpiration openings in the seal or nozzle elements.

The present invention, by defining one or more annular volumes for conducting a flow of cooling air therethrough, is well adapted to both resist the effects of the adjacent high temperature gases on the seal assembly structure as well as to protect adjacent, temperature sensitive structure such as the annular bearings 34 from overheating Such cooling flow is likewise available to that portion of the seal assembly 28 coincident with the sector of the rim 32 secured to the arc valve 18 whereby cooling gas may flow circumferentially through the contiguous second annular volume 54 and outward through openings in the L-shaped seal 44 as discussed hereinabove. Cooling air supplied to the portion of the first annular volume 52 disposed adjacent this sector of the rim 32 may also pass out of the first volume 52 and into a radially outward portion 54' of the second annular volume, however it should be noted that the seal, valve, bearing, and other structures adjacent the arc valve 18 are already protected against the high temperature gases contained in the nozzle interior 38 by the presence of the internally cooled arc valve 18 adjacent thereto. It is therefore within the scope of the present invention to distribute cooling openings 56, 50 and other flow directing structure about the circumference of the seal assembly 28 according to the present invention to achieve the desired amount of local cooling and to thereby avoid having an unnecessarily large flow of cooling air.

One further feature of the seal assembly 28 according to the present invention is the ability of the seal to be energized by the presence of an elevated pressure cooling gas within the annular volumes 52, 54. As will be appreciated by viewing the drawing Figures, especially FIGS. 2 and 3, both the first seal element 40 and the L-shaped second seal element 44 have their respective seal legs 40', 44' urged more firmly against their respective sealing surfaces by the presence of an elevated pressure gas within the adjacent corresponding annular volumes 52, 54. The presence of the elevated pressure cooling air not only serves to achieve this positive energization of the seal elements 40, 44, but also provides the necessary pressure head to insure that the cooling air will flow into the nozzle interior 38 if desired.

It may be required, depending upon the particular construction of the annular bearing 34, to provide an annular sealing washer 57 or the like for preventing unwanted and excessive flow of cooling air through the bearing 34. Such sealing washer 57 is placed intermediate the annular bearing 34 and the second annular volume 54 and extends radially outward to span any gap which may exist between the inner and outer bearing races.

It is thus apparent that the seal assembly 28 is well adapted to achieve the objects and advantages as set forth hereinabove. It will further be appreciated that the foregoing disclosure is directed to one exemplary embodiment of the seal assembly 28 according to the present invention and should therefore not be interpreted as limiting as there are other equivalent embodiments which may be made without departing from the scope of the invention as disclosed above and claimed hereinafter.

I claim:

1. A gas tight seal assembly for an annular region defined between first and second concentric, coaxially rotatable members and a surrounding static wall having a planar portion and an annular portion, the first member presenting a portion that is generally flat and annular and oriented parallel to the planar wall portion and presenting a circumferential portion generally parallel to said annular portion, the second member having an annular rim disposed radially outward from the flat and annular portion of the first member with respect to the axis of rotation and further including an arcuate hood secured to a sector of the annular rim and extending axially therefrom, the axis of rotation of the first and second members being substantially perpendicular to the planar wall portion, the circumferential portion extending in an axial direction opposite that of the arcuate hood, wherein the seal assembly comprises, in combination:

a radially outward facing sealing means radially compressed between the rim of the second member and the annular wall portion;

an L-shaped annular sealing means having an annular, axially extending sealing leg contacting said circumferential portion, and a radially outwardly extending second leg;

a circular web, positioned within the annular region and secured between the outward facing sealing means and the L-shaped sealing means, the web including an arcuate opening corresponding to the portion of the annular region coincident with the sector of the rim secured to the arcuate hood, said web having a radial portion and an axially extending portion extending in the same direction as said circumferential portion and attached to the outer periphery of said radial portion, said radially outward facing sealing means being attached to said axially extending circumferential portion of the first member; and wherein the radially outwardly extending second leg of the portion of the L-shaped sealing means has a separated portion thereof disposed coincident with the sector of the rim secured to the arcuate hood and is sealingly engaged thereat with a radially extending, axial end portion of the arcuate hood, said second leg being engaged about the rest of the periphery with said radial portion of said web.

2. The annular seal assembly as recited in claim 1, further comprising:

means for admitting a flow of cooling air into a first annular volume defined by the annular wall portion and the outward facing sealing means.

3. The annular seal assembly as recited in claim 2, further comprising:

an annular bearing, disposed between the circumferential portion of the first member and the annular rim and axially spaced apart from the radial portion of the web; and means for conducting at least a portion of the flow of cooling air from the first annular volume into a second annular volume defined by the first member, the second member the web, the L-shaped sealing means and the annular bearing.

4. The annular seal as recited in claim 3, further comprising:

means, disposed in the axially extending leg of the L-shaped sealing means for conducting at least a portion of the flow of cooling air therethrough.

5. A seal assembly for an annular region defined by a generally planar wall, a first member, presenting a generally flat and annular portion parallel to the wall, disposed in an opening in the wall defined by an annular, axially extending portion of the wall and having a concentric annular rim disposed therebetween, the first member and rim each independently rotatable about a common axis oriented substantially perpendicular to the planar wall, the first member including a circumferential portion generally parallel to the annular wall portion, the rim further including an arcuate hood extending parallel to the rotation axis and secured to a sector of the rim, comprising, in combination:

a first annular seal means radially compressed between the annular portion of the wall and the rim, a second annular seal means disposed radially outward of the first member and sealingly engaged with the circumferential portion thereof, the second annular seal means further having a separated portion coincident with the sector of the rim secured to the hood and the separated portion engaged with a radially extending axial end portion of the arcuate hood; and a circular web, having an axially extending portion sealingly secured to the first annular seal and a radially inward extending portion secured to the second annular seal means, the web further including an arcuate opening extending circumferentially around the portion of the annular region coincident with the arcuate hood.

* * * * *